Patented Feb. 21, 1933

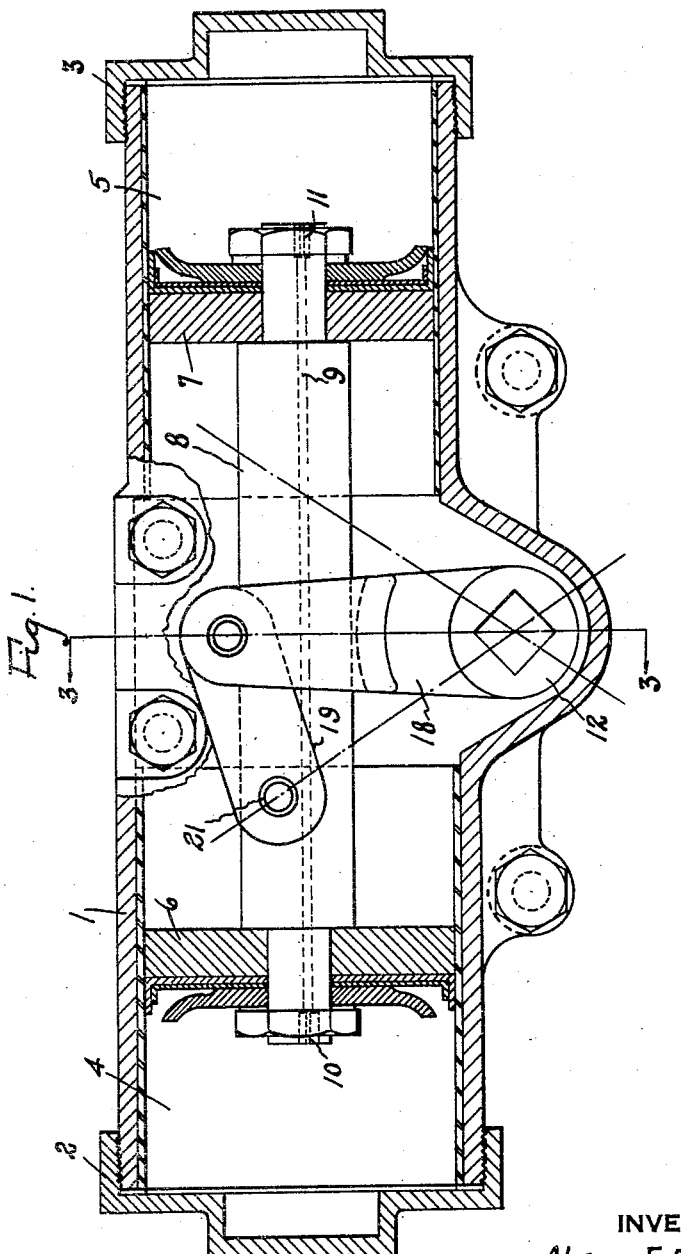

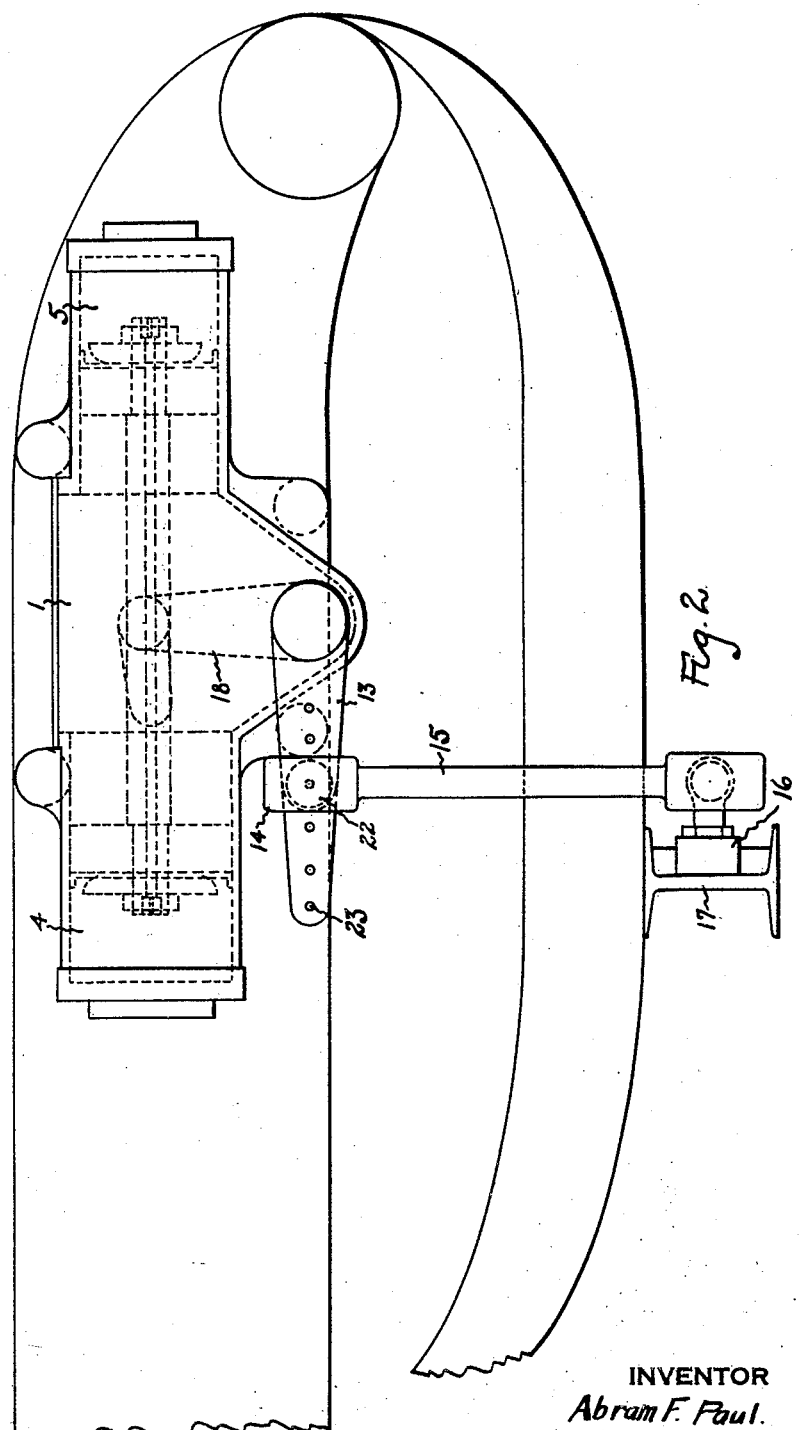

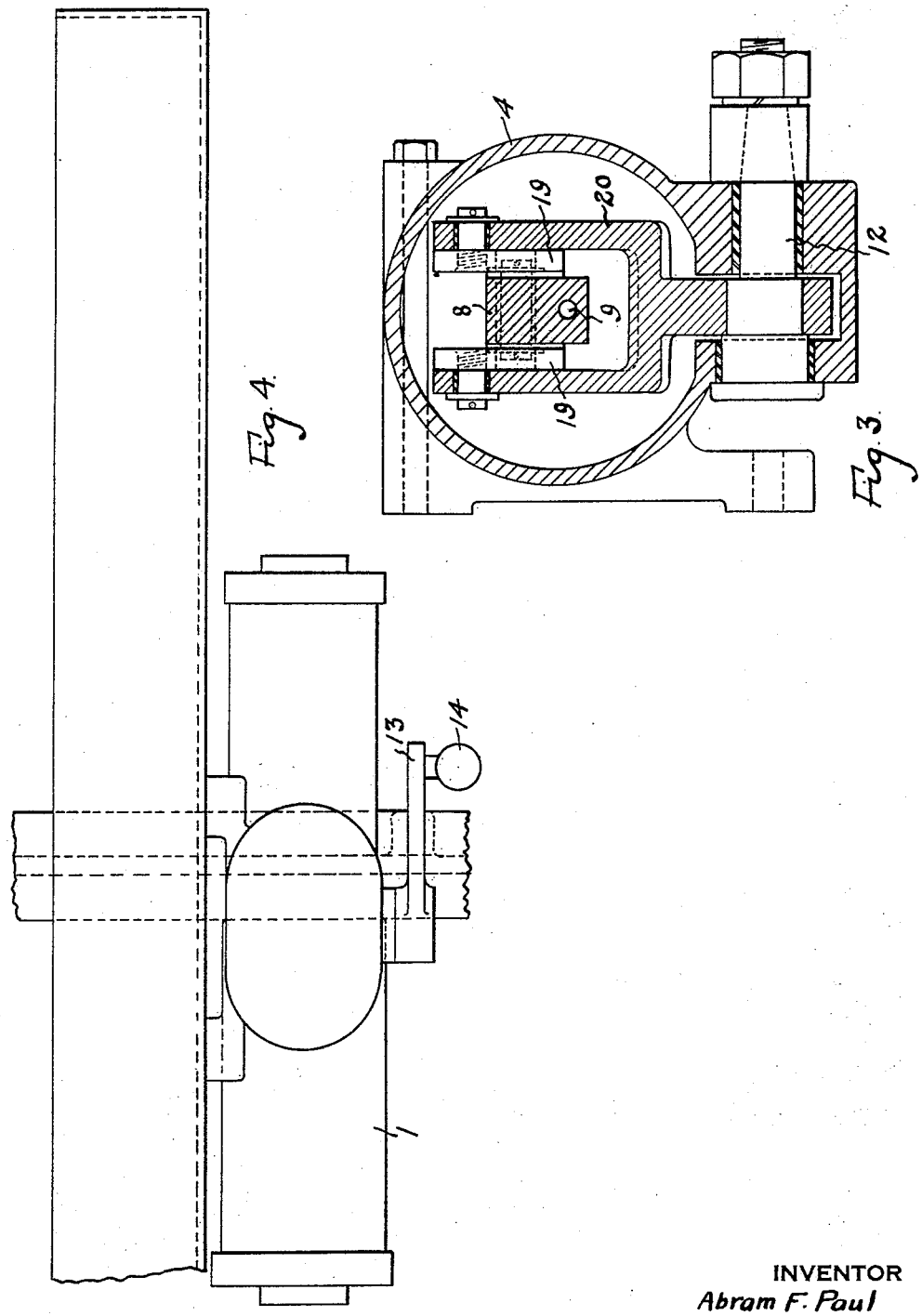

1,898,210

UNITED STATES PATENT OFFICE

ABRAM F. PAUL, OF LLANERCH, PENNSYLVANIA, ASSIGNOR TO NATIONAL PNEUMATIC COMPANY, OF NEW YORK, N. Y., A CORPORATION OF WEST VIRGINIA

SHOCK ABSORBER

Application filed July 29, 1931. Serial No. 553,758.

More specifically my invention relates to shock absorbers for vehicles, such as automobiles, motor buses, trackless trolleys, and the like, which run upon the public highways.

Among the objects of my invention is the provision of a shock absorber which will not impede the action of the vehicle springs in absorbing the vibrations caused by small irregularities in the surface of the roadway, but will immediately function when excessive spring action is caused by the striking of abnormal surface irregularities, and do their work in both directions, that is to say, upon both the downward and upward movement of the spring and the vehicle frame.

My invention also contemplates the employment of air as a shock absorbing medium taking advantage of its property of compressibility which has the virtue of absorbing the shock in direct proportion to the impact and eliminating the secondary shocks which are produced by the shock absorber itself when a non-compressible fluid is employed therein. Such secondary shocks are particularly destructive to the shock absorber itself.

A further advantage of using air as the absorbing medium lies in its uniformity of action, irrespective of temperature. When fluids are used they become thick or thin as the temperature varies and, since it is practically impossible to automatically compensate for such changes, the action of the shock absorber varies with the temperature.

Provision is also made by my invention for preventing the rebound which would ordinarily result from the very fact that air is elastic so that I take advantage of this valuable shock absorbing quality of air and avoid the undesirable effects. I accomplish this by providing for a greater shock absorbing effect upon the rebound than upon the downward movement of the vehicle on the springs, and also in this way I eliminate the well-known tendency to build up a series of oscillations which cause the vehicle to pitch under certain road conditions commonly encountered.

My invention also makes possible a shock absorber of great durability and reliability. All stuffing boxes, glands, and the like which cannot be kept leak-proof under the hard usage to which such devices are subject being unnecessary.

One embodiment of my invention is shown and described in the accompanying drawings, in which;

Figure 1 is a vertical cross-section along the longitudinal axis of the shock absorber with some of the moving parts shown in elevation;

Fig. 2 is a side elevation illustrating one way in which my shock absorber may be applied to the vehicle;

Fig. 3 is a transverse cross-section along the line 3—3 of Fig. 1; and

Fig. 4 is a plan view.

As generally stated above, I employ air as the shock absorbing medium because of its superior qualities for the purpose, namely, its compressibility. To do so I employ the following structure, which, it will be observed, is extremely simple and free from parts likely to deteriorate in use, such as stuffing boxes, glands, etc. The embodiment illustrated by the drawings consists of a body 1 having opposed cylinders 4 and 5 at either end, the outer ends of which are closed by airtight caps 2 and 3. The internal diameter of one cylinder 4 is preferably larger than the internal diameter of the other cylinder 5. Pistons 6 and 7 rigidly connected together by a connecting rod 8 so that they move as a unit, are provided to reciprocate within cylinders 4 and 5, respectively.

Connecting rod 8 is drilled throughout its length with a small longitudinal by-pass 9 to provide an air passage between cylinders 4 and 5, preferably offset somewhat from the longitudinal axis of connecting rod 8, as shown in Fig. 1, and fitted at either end with a replaceable plug 10 and 11, each having an orifice communicating with the by-pass. By the substitution of plugs with orifices of varying diameter the amount of air which may pass through the by-pass may be controlled. The size of the orifices is preferably such that the pressure in the cylinder under low pressure may return to normal or above normal before the pistons reach their normal position of rest.

Beneath and between the cylinders proper is a rotatable transverse shaft 12 mounted in suitable bearings in the body 1, one end of which projects through the body and to which is connected an arm 13 extending normally in a substantially horizontal direction when the absorber is at rest. This arm connects with the one end 14 of the usual link 15, the other end of which is provided with a usual ball and socket joint and bracket 16 for attachment to the axle 17 of the vehicle. Within the body and rigidly attached to the transverse shaft 12 is a crank 18 normally positioned substantially at right angles to the longitudinal axis of the connecting rod and connected at its upper end to connecting rod 8 through the pivoted link 19, as best shown in Fig. 1.

In the preferred construction, the upper end of internal arm 18 is forked, as best shown at 20 in Fig. 3, so as to straddle connecting rod 8 and two links 19 are used, one connected to each of the forked ends of the arm 18 and to opposite sides of the connecting rod 8. In this way a symmetrical structure is provided having great durability and strength.

As stated above, the by-pass 9 is preferably offset somewhat from the longitudinal axis of connecting rod 8 to provide ample space for the connecting rod bearing 21 of link 19, as shown in Fig. 1. This is not essential, however.

Means for varying the length of piston travel in proportion to the relative movement of spring and frame is provided in external arm 13, the effective length of which may be varied by positioning ball joint 22 in any one of the holes 23. External arm 13 should also be adjustable upon shaft 12 so its angular position may be maintained irrespective of whether the absorber is attached to the vehicle frame in a horizontal, vertical or other position.

The shock absorber body 1 is mounted upon the vehicle frame in any desired position, as stated above, external arm 13 being adjusted so as to extend normally in a substantially horizontal direction and so that upon the rebound the air in cylinder 4 will be compressed. Link 15 having been attached to external arm 13 and to axle 17 and the necessary adjustments having been made to secure the desired degree of piston travel for the vehicle to which it is applied and the road conditions to be met, the device is ready for use. In operation, obviously, every movement of the spring will be accompanied by a corresponding movement of pistons 6 and 7 in their respective cylinders. However, normal spring action is substantially unaffected because there will be little compression of the air in the cylinders, and it will pass from one cylinder to the other through the by-pass with little resistance, when the piston movement is so small. However, greater spring and body movements will cause greater movements of the pistons with the result that air pressure will be raised in one cylinder and reduced in the other, due to the inability of the air to pass sufficiently rapidly through the by-pass. In this way the action of the body and spring in either direction is effectively resisted by both cylinders. Due to the compressible nature of air this resistance will be cushioned and wholly unlike the resistance offered by an uncompressible fluid. However, the elasticity of air under compression and the low pressure in the other cylinder would tend to drive the pistons in the opposite direction and to accent rather than absorb the rebound were it not for the fact that the conditions are rapidly, though gradually, reduced by the passage of air through the by-pass from the cylinder of high pressure to the cylinder of low pressure, thus restoring the absorber to its normal state with both cylinders at atmospheric pressure. There is a pause between the downward and rebound movements of the spring which adds additional time for the passage of air from the cylinder under compression to the other so that the piston of the other cylinder on its working stroke will start to compress the air in that cylinder before it has reached the position in the cylinder which it assumes when the spring is at rest.

Shock absorbers designed to have the same absorbing effect in both downward and upward directions tend, under some conditions, to continue rather than to prevent oscillation of the vehicle. In view of this and also because the most objectionable effects from road irregularities result from the rebound, I prefer to make the cylinders of my device of different diameters, that of the larger diameter being the one in which the air is compressed upon the rebound. Then the absorbing effect upon the rebound will be greater and there can be no synchronization of the acting and opposing forces, with the consequent undesirable oscillatory effects. In the form of my device illustrated by Fig. 1, for example, cylinder 4 is of larger diameter than cylinder 5. Cylinder 4 would, therefore, be the cylinder under compression upon the rebound and, because of its greater diameter, would have a greater absorbing effect than cylinder 5 would have when it is under compression.

The form of absorber which I have described is merely illustrative. I do not intend to limit my invention thereto in any respect.

I claim:

1. A shock absorber of the class described, comprising a body for attachment to a vehicle frame which consists of two opposed air-tight cylinders of different diameters and an intermediate portion, a reciprocable piston in each cylinder, an air passage between said cylinders, means for causing the pistons to move in unison, and means connecting said last means with the vehicle axle for imparting to said pistons movements coincident with and proportional to relative movements of the vehicle frame and axle.

2. A shock absorber of the class described, comprising a body for attachment to a vehicle frame which consists of two opposed air-tight cylinders of different diameters and an intermediate portion, a reciprocable piston in each cylinder, an air passage between said cylinders, means for varying the air transmitting capacity of said passage, means for causing the pistons to move in unison, and means connecting said last means with the vehicle axle for imparting to said piston movements coincident with and proportional to relative movements of the vehicle frame and axle.

3. A shock absorber of the class described, comprising a body for attachment to a vehicle frame which consists of two opposed air-tight cylinders of different diameters and an intermediate portion, a reciprocable piston in each cylinder, a connecting rod joining said pistons, and means connecting said last means with the vehicle axle for imparting to said pistons movements coincident with and proportional to relative movements of the vehicle frame and axle.

4. A shock absorber of the class described, comprising a body for attachment to a vehicle frame which consists of two opposed air-tight cylinders of different diameters and an intermediate portion, a reciprocable piston in each cylinder, an air passage between said cylinders, a connecting rod joining said pistons, and means connecting said last means with the vehicle axle for imparting to said pistons movements coincident with and proportional to relative movements of the vehicle frame and axle.

5. A shock absorber of the class described, comprising a body for attachment to a vehicle frame which consists of two opposed air-tight cylinders of different diameters and an intermediate portion, a piston in each cylinder normally positioned intermediate the cylinder ends, a connecting rod between said pistons, means for imparting motion to said connecting rod and pistons proportional to and coincident with the relative motion between the vehicle axle and frame, an air passage between said cylinder having an air transmitting capacity sufficient to permit the pressure in both cylinders to tend to become equalized before the pistons reach their normal position after having been moved in either direction.

6. A shock absorber of the class described, comprising a body for attachment to a vehicle frame which consists of two opposed air-tight cylinders and an intermediate portion, a connecting rod joining said pistons, a bell-crank pivotally mounted in the body intermediate the cylinders, a link connecting one end of said bell-crank and said connecting rod for transmitting rotary movement to said crank into reciprocatory movement of said pistons and connecting rod, a connecting link, one end of which is connected to said last mentioned end of said bell-crank, the other end being associated with means for attachment to the vehicle axle, said cylinders being connected by an air passage through said pistons and connecting rod, having an air transmitting capacity sufficient to permit the pressure in both cylinders to tend to become equalized before the pistons reach their normal position after having been moved in either direction.

In testimony whereof I have hereunto set my hand this 16th day of July A. D., 1931.

ABRAM F. PAUL.